March 9, 1937. A. B. REDMAN 2,073,254
METHOD AND MOLD FOR CASTING GLASS
Filed April 19, 1935 2 Sheets-Sheet 1
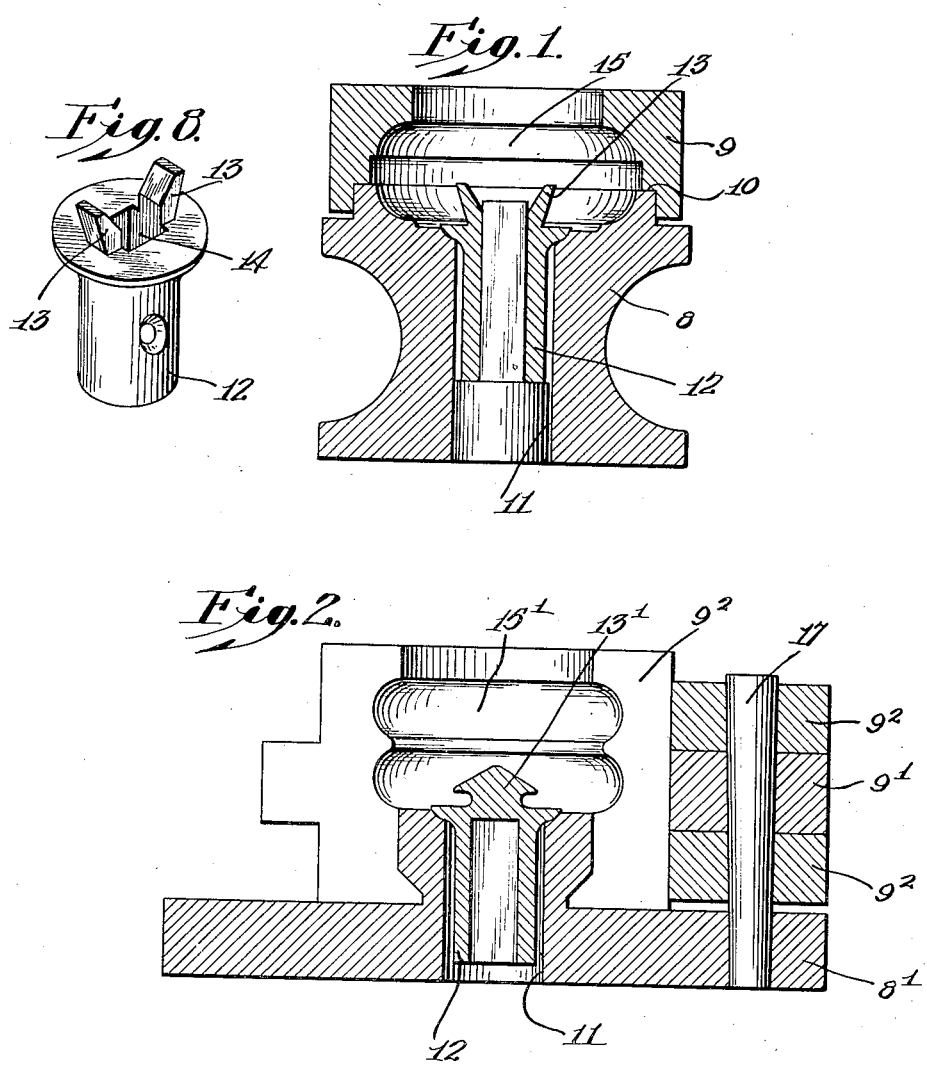
Witnesses:
Inventor
Allen Bryce Redman
by W. Steell Jackson and Son
Attorneys.

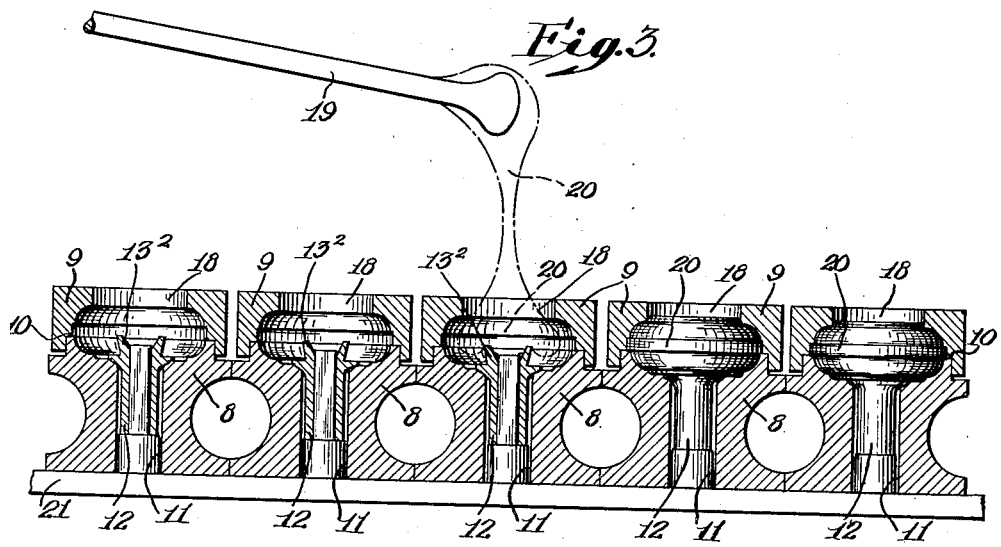
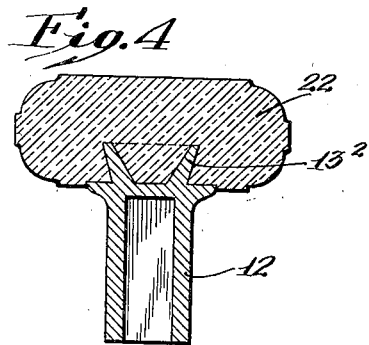
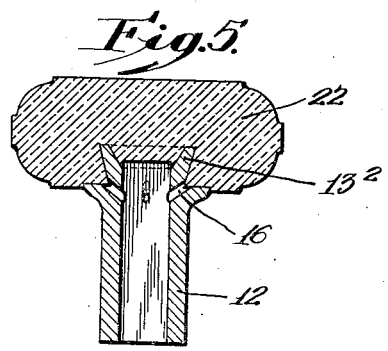
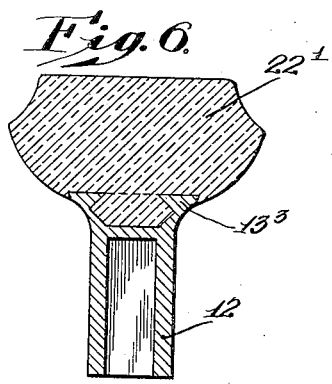
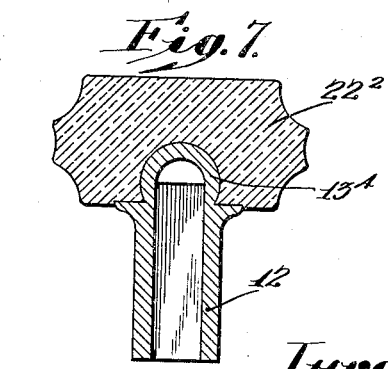

Patented Mar. 9, 1937

2,073,254

UNITED STATES PATENT OFFICE 2,073,254

METHOD AND MOLD FOR CASTING GLASS

Allen Bryce Redman, Millville, N. J., assignor to T. C. Wheaton Co., Millville, N. J., a corporation of New Jersey Application April 19, 1935, Serial No. 17,179

8 Claims. (Cl. 49—66)

My invention relates to a process and apparatus for manufacturing knob assemblies, each assembly including a metal socket and a knob of glass or the like permanently mounted on an insert end of the socket, the invention being more particularly directed to the molding of glass knobs or the like on to the shank ends of metal parts, the shanks of the metal members comprising inserts about which the solid glass is molded or cast.

The present application is in part a substitute for my application Serial No. 598,342, filed March 12, 1932, for Method and mold for casting glass knobs.

It has been the practice, prior to my invention, when manufacturing a knob assembly that includes a metal socket and a glass knob permanently mounted thereon, the socket extending from and being rigidly connected to the knob, to mold the glass knob by itself with a recess adapted to receive an attachment end of the socket, and to fit and cement or spin the socket to the knob after the manufacture of the knob has been completed.

In the foregoing process the glass knobs are molded by pressure molding, (direct pressure or pressure provided by vacuum) separate from the socket members.

In press molding the molten glass is pressed into very intimate contact with the interior surface of the mold which leaves the surface on the press molded knobs with mold marks and a characteristic appearance that is commercially undesirable and in practice the press molded knobs have therefore needed to be reheated for fire polishing to remove the mold marks.

Frequent attempts have been made to mold the knobs directly to place on to the shank ends of socket members.

This procedure avoids the need for cementing or spinning the knob and socket members together subsequent to the molding but the process has been but indifferently satisfactory principally because of the frequent cracking of the knobs. This has most commonly occurred during or incident to the reheating of the knobs for fire polishing or the removal of mold marks, but also in use of the knobs upon the doors. The losses from breakage during or from the reheating process have usually been so great as to more than overbalance the advantages gained from saving the manufacturing step of cementing or spinning the socket and knob members together subsequent to the manufacture of the knob.

The direct molding of the glass knobs on to the shank ends of the metal sockets has hitherto been by a pressure molding process in which the glass is strongly forced into shape, into intimate engagement with the mold interior and into intimate engagement with the metal insert, and I have discovered that, if the volume of glass about the insert be made full so as to maintain the temperature of this portion of the glass until it has fully flowed to position, all need for pressure of the molten glass during the molding is avoided.

Direct molding or casting of the glass knobs on to the shank ends of the sockets in thus made easy, inexpensive and very satisfactory and the character of the surface of the glass knobs molded with an avoidance of pressure other than gravity is so much better than the surface of press or pressure molded knobs that the need for any reheating treatment, for fire polishing or the like, is eliminated or greatly lessened.

A purpose of the present invention is to lessen the closeness of engagement during glass molding between the glass and a metal insert thereby greatly lessening any danger of the glass shattering if the molded article is subjected to a reheating operation for the purpose of fire polishing or during the annealing process.

A further purpose is to lessen during glass molding the closeness of engagement between the glass and the interior of the mold thereby avoiding mold marks or/and deleterious surface characteristics upon the molded product, thereby greatly reducing or eliminating any need for the usual reheating treatment of the prior art.

A further purpose is to cast the glass knobs about the shank ends of metal sockets or the like in open gravity molds as distinguished from closed or press molds.

Further purposes will appear in the specification and in the claims.

I have preferred to illustrate my invention by one general line of casting only and relating to one type of manufacture only but showing slight variations in the application to this line and have selected a line and variations thereof especially suitable to carrying out and to illustrating the invention.

Figure 1 is a vertical section through a two-part open mold, shown seating a socket for permanent assembly with the molded knob, the shank end of the socket being presented as an insert into the mold which is ready to receive a charge of molten glass.

Figure 2 is a section similar to Figure 1 showing a slightly modified form and additional structure.

Figure 3 is a section similar to Figures 1 and 2 but showing a plurality of molds in the act of being filled with molten glass.

Figure 4 is a sectional view of a door knob cast in the molds of Figure 1.

Figures 5, 6 and 7 are sectional views showing other suggested forms.

Figure 8 is a perspective view of the insert seen in Figure 1.

In the drawings similar numerals indicate like parts.

Describing in illustration and not in limitation and referring to the drawings:—

I have found that elimination of the pressure under which molten glass has hitherto been molded (a pressure always existent in press molding) avoids deleterious surface characteristics that have hitherto been inherent features of molded glass knobs with metal inserts until or unless the knobs have been put through a corrective reheating process, and that I may thus eliminate any need for a reheating operation, such as fire polishing, subsequent to the molding operation.

I have found further that when a glass door knob, for example, is to be molded about a metal insert elimination of the pressure under which molten glass has hitherto been molded gives a better permanent connection between the glass and insert than is possible with press molding—the engagement between the glass and the insert being adequately intimate to provide a connection effective, rigid and strong yet actually with the small sufficient freedom for relative movement between the adjacent glass and metal needed to avoid or greatly lessen the danger of the glass shattering with or without jar during or after cooling or if the molded knob assembly be subjected to a reheating operation, as flame polishing.

The tendency to shatter in use with or without jar is due to the setting up of stresses through contraction of glass which has been firmly pressed against the insert while still molten.

The tendency to shatter under the reheating treatment or during an annealing process is doubtless due to the simultaneous presence of two factors. These factors are first a material difference in the expansion coefficients of the glass and its metal insert and second a connection between the glass and insert too intimate to permit the small relative movement at the engagement surfaces needed for an accommodation of the difference of expansion or/and of contraction of the two materials.

I mold the glass knobs in open as distinguished from press molds and thereby obtain molded knobs that usually do not need to be subjected to any reheating finishing process.

It is highly desirable that the glass comprising the knob be of such shape as to allow quite an appreciable space between the metal shank end and the most closely adjoining parts of the mold in order that the molten glass may not be unduly chilled or subjected to objectionable surface tension in its flow into this part of the mold; also that the tang or other shank end used may be so formed as not to present narrow undercut spaces which the glass will but imperfectly fill.

In the manufacture of glass knobs, referred to above, I pour the glass into open molds upon the shank ends of the metal sockets, thereby obtaining knob assemblies at a single molding operation that are of good commercial appearance without further heat treatment and that will stand further heat treatment far better than the knob assemblies of the prior art in which the glass has been molded in a press mold upon the shank end of the knob socket.

In Figure 1 I show a two-part mold. The mold comprises a base 8 and top 9 horizontally divided at 10. The base is vertically perforated at 11 to seat the metal socket 12. The insert portion 13 of the socket extends up into the mold and has a contour laterally and longitudinally suited for an effective connection with the glass. During molding the socket 12 becomes heated to approximately the temperature of the mold, which is much below that of the glass. The top of the mold is open at 18 for charging with glass.

Preferably the insert end extends upwardly and diagonally outwardly in the form of prongs which have but slight volume of metal to affect the glass either by chilling—if the insert be not properly heated—or by the effects of surface tension.

Moreover, the angle of the flare of the prongs is preferably slight with respect to the axis of the insert socket. The hollow of the socket is shown in Figure 1 as extended up into the knob, both to allow air to escape at this point and to give room for insertion of the bar into the knob to a greater extent than would otherwise be the case. This extension of the hollow of the socket is shown at 14. During the casting it is filled with a suitable plug to prevent flow of the molten glass down into it.

In Figure 1 the mold is opened to remove the knob assembly, by vertically lifting away the top 9. In the modified form of Figure 2 the top is vertically divided in the plane of the paper and the forward and rearward portions 9' and 9² may be opened and closed by swinging them about a pivot 17 that extends downward into the base 8'.

The form of mold shown in Figure 2 is particularly advantageous when the shape of the knob is such as to require or make desirable a three-part mold for delivery of the molded product, as illustrated in the indicated knob of Figure 2. With the knob indicated by the mold interior of Figure 2 the upper portion of the mold needs to be or is desirably split vertically for easy delivery of the molded product.

It will be understood that Figures 1 and 2 are intended both for illustrations of specific forms of open molds well suited for casting glass knobs about the shank ends of the sockets and also as conventional illustrations for any open molds adapted to use in the intended way. The mold will, in practice, be modified with respect to lines of division, according to the needs incident to the different forms of knobs desired.

The insert shown in Figure 2 is not as desirable as that in Figure 1 because of the narrow annular ring in Figure 2 which must reasonably be filled with glass in order to hold the parts firmly together. It will be noted that the volume of glass immediately adjacent the neck or ring in the insert has been made larger than that immediately adjacent the bases of the prongs in Figure 1 in order that the glass may remain molten longer and more fully molten for a sufficient time in Figure 2 for the glass to fill the contour of the insert.

Figures 4–7 illustrate a few only of the many forms of knob and a few out of many different forms of shank inserts to which the invention is applicable and it will be understood that each of the many different forms of knob may be cast about any one of the many forms of socket shanks if enough mass of glass is provided adjacent the shank to keep the glass molten at the shank until the glass has conformed to the shape of the shank.

The glass may be introduced into the open mold by any of the various glass transfer processes now in use, preferably just the proper amount of glass being poured into the mold to settle evenly and smoothly and to provide upon cooling an adequately firm hold upon the insert and a character of surface adjacent the mold interior and across the open mold top making any reheating treatment usually unnecessary.

The character of hold between the glass and metal insert, while sufficiently firm, is yet without doubt in fact less close than the hold between the glass and insert if the casting be effected by the usual press molding, and as a result, my molded knob assemblies may if desired, be reheated for fire polishing or the like with far less danger of breakage incident to the different expansion coefficients of the glass and metal than with the press molded product.

In Figure 3 is illustrated a convenient method of carrying out my process. The open molds are filled, one after another, about the inserts. The air in the molds can get out along the plugs shown as filling the hollows of the inserts, that is, through the openings 14.

When the space 15 has been filled about the prongs 13 the glass comes into rest in a smooth and polished upper surface. The amount of glass put in by the rod or punty 19 is just sufficient to fill out the top of the knob. The mold is held together by a pintle 17. The space 18 is thus not ordinarily filled. The molds preferably separate at a division line of the glass as at 20. The combined knob and insert of Figure 4 differ from that of Figures 1 and 3 in two particulars, in that there is a flaring flange insert at 13² as distinguished from the prongs in the other figures and in that the hollow of the socket is not carried through into the knob.

The knob 22 of Figure 5 is the same as the knob of Figure 4 but in this figure the hollow of the socket is carried through into the knob. In addition to this, openings 16 are provided by which air trapped against the flaring flange can escape through the socket. These openings are preferably too small for much glass to enter them. However, there would be some slight advantage in having the glass enter in giving an additional hold of glass.

The form of Figure 6 offers a concavity for glass flow within the rim 13³, offering a reversal from this standpoint of the form of Figure 2. The knob 22' of Figure 6 and the knob 22² of Figure 7 differ from the other knobs in ways which are inconsequential except insofar as they may effect the volume of hot glass within easy flow and heat-conducting distance of the contour of the socket which is to be filled or against which the glass ultimately is to be poured.

In Figure 7 the socket terminal within the knob is a partial cylinder which is gripped by the glass and which the glass holds by reason of the extension of the cylindrical surface beyond the half circle.

In the casting in Figure 3 I illustrate a conveyor 21 which forms a convenient holder and transfer means for the molds. It is equally applicable to all of the forms.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of manufacturing a glass knob, which consists in pouring the glass in an open mold having an interior contour substantially that of the intended knob under the pressure only of gravity acting on the weight of the molten glass and throughout the molding free from molding pressure except that incident to the said gravity.

2. The method of manufacturing a knob assembly comprising an insert having a shank and a glass knob rigidly connected to the shank, which consists in locating the socket so that the insert thereof projects into an open molding space, in delivering molten glass into the space, and while maintaining the glass within the molding space free from molding pressure other than that from the weight of the delivered glass, permitting the glass to mold to form and harden about the insert under the pressure merely of the weight of the glass within the space.

3. The method of casting glass knobs about metal inserts, which consists in projecting the metal insert into an open mold and while maintaining the molding space of the mold continuously open to atmospheric pressure, in casting the molten glass by gravity within the molding space and about the metal insert and allowing the glass to set free from other pressure.

4. The method of casting glass knobs about metal inserts and free from necessity for flame treatment after the casting operation, which consists in projecting the metal of the insert within a molding space of an open mold, intended to be filled by the glass while heating the insert from the mold, in pouring the glass into the open molding space and while maintaining the molding space open, in settling the glass within the molding space by gravity alone while the glass is setting.

5. The method of casting glass about metal inserts which consists in placing the insert in position to project into the molding space of an open mold, in providing a volume of glass about the insert sufficient to keep the glass molten until it conforms to the insert and the interior walls of the mold and in casting the molten glass by gravity alone.

6. In the manufacture of a knob assembly including a socket having a shank and a glass knob molded upon the shank, an open mold including a base vertically perforated to surround and seat the socket and to upwardly present the shank into the mold and a top member seated upon the base and vertically perforated to provide an opening for the charge of glass free from molding pressure other than gravity upon the glass.

7. In the manufacture of a knob assembly comprising a socket having a shank and a glass knob surrounded by and permanently connected to the shank, an open mold comprising a base vertically perforated to surround and seat the socket and to present the shank thereof upwardly into the mold and a vertically divided top member open at the top thereof to receive molten glass and adapted to open and close by swinging horizontally about a pivot, the mold in closed position with the socket in place being free from ports except at the top and the space within the mold being under atmospheric pressure.

8. In the manufacture of a glass assembly including a socket having a shank to which the glass is to be molded, an open mold adapted to seat the socket and having a space within the mold surrounding the socket of sufficient size to maintain the heat of the glass until the glass has conformed to the socket and means dividing the mold into parts suitable for releasing the glass after it is cast, the space within the mold being under atmospheric pressure and the mold walls being free from suction and pressure ports.

ALLEN BRYCE REDMAN.